(12) United States Patent
Sawlaw et al.

(10) Patent No.: US 11,822,339 B2
(45) Date of Patent: Nov. 21, 2023

(54) PREDICTIVE TECHNIQUE FOR DISPENSING PRODUCT FROM TRACTOR TOOL

(71) Applicant: Deere & Company, Moline, IL (US)

(72) Inventors: Solomon J. Sawlaw, Des Moines, IA (US); Ryan C. Burnley, Ankeny, IA (US); Ray M. Scheufler, Johnston, IA (US); Curtis A. Maeder, Johnston, IA (US); Sean A. Mahrt, Le Claire, IA (US)

(73) Assignee: DEERE & COMPANY, Moline, IL (US)

( * ) Notice: Subject to any disclaimer, the term of this patent is extended or adjusted under 35 U.S.C. 154(b) by 169 days.

(21) Appl. No.: 17/364,092

(22) Filed: Jun. 30, 2021

(65) Prior Publication Data

US 2023/0004167 A1    Jan. 5, 2023

(51) Int. Cl.
*G05D 1/02* (2020.01)
*A01B 69/04* (2006.01)
(Continued)

(52) U.S. Cl.
CPC ......... *G05D 1/0223* (2013.01); *A01B 69/008* (2013.01); *G05D 1/0088* (2013.01);
(Continued)

(58) Field of Classification Search
CPC .. G05D 1/0223; G05D 1/0088; G05D 1/0094; G05D 2201/0201; A01B 69/008;
(Continued)

(56) References Cited

U.S. PATENT DOCUMENTS 6,216,614 B1    4/2001 Wollenhaupt
6,510,367 B1*   1/2003 McQuinn ............. A01B 79/005
                                                       239/69
(Continued)

FOREIGN PATENT DOCUMENTS

EP    3132682 A1    2/2017

OTHER PUBLICATIONS

Extended European Search Report and Written Opinion issued in European Patent Application No. 22178044.8, dated Dec. 1, 2022, in 07 pages.

*Primary Examiner* — Rachid Bendidi
*Assistant Examiner* — Abdalla A Khaled
(74) *Attorney, Agent, or Firm* — Fenwick & West LLP (57) ABSTRACT

A device detects a trigger to dispense a product at a using a tool operably coupled to a tractor. The device determines whether the tractor is in an automated mode, the automated mode enabling autonomous speed and direction navigation of the tractor. Responsive to determining that the tractor is not in the automated mode, the device determines whether the tool is in a ready state, and responsive to determining that the tool is in the ready state, commands the tool to dispense the product, wherein the tool is not commanded to dispense the product until the tool is in the ready state. Responsive to determining that the tractor is in the automated mode, the device commands the tool to dispense the product without determining whether the tool is in the ready state.

17 Claims, 9 Drawing Sheets

(51) Int. Cl.
  *G05D 1/00* (2006.01)
  *A01B 79/00* (2006.01)
  *A01C 7/08* (2006.01)
  *A01C 7/10* (2006.01)
  *A01C 21/00* (2006.01)
  *A01G 25/09* (2006.01)
  *A01G 25/16* (2006.01)

(52) U.S. Cl.
  CPC .......... *G05D 1/0094* (2013.01); *A01B 79/005* (2013.01); *A01C 7/081* (2013.01); *A01C 7/102* (2013.01); *A01C 21/005* (2013.01); *A01G 25/09* (2013.01); *A01G 25/16* (2013.01); *G05D 2201/0201* (2013.01)

(58) Field of Classification Search
  CPC ....... A01B 79/005; A01C 7/081; A01C 7/102; A01C 21/005; A01G 25/09; A01G 25/16; A01M 7/0089

See application file for complete search history.

(56) References Cited

U.S. PATENT DOCUMENTS

| | | |
|---|---|---|
| 8,375,873 B2 | 2/2013 | Nelson et al. |
| 9,880,560 B2 | 1/2018 | Han et al. |
| 9,904,290 B2 | 2/2018 | Pickett et al. |
| 10,470,358 B2 | 11/2019 | Sauder et al. |
| 2002/0099472 A1* | 7/2002 | Benneweis .......... A01B 79/005 700/242 |
| 2010/0298994 A1* | 11/2010 | Mitchell .............. A01B 79/005 700/283 |
| 2014/0070019 A1 | 3/2014 | Chiocco et al. |
| 2016/0185476 A1* | 6/2016 | Farris ................. B65B 69/0033 414/412 |
| 2016/0212930 A1* | 7/2016 | Renault .................. A01C 7/081 |
| 2017/0112049 A1 | 4/2017 | Weisberg et al. |
| 2017/0308091 A1* | 10/2017 | Bunderson ........... A01B 69/008 |
| 2018/0359907 A1* | 12/2018 | Kelley ................ G05D 1/0223 |
| 2018/0359908 A1* | 12/2018 | Kelley ................ G05D 1/0274 |
| 2019/0353483 A1 | 11/2019 | Liu et al. |
| 2020/0019159 A1* | 1/2020 | Kocer ................. G05D 1/0044 |
| 2020/0187409 A1* | 6/2020 | Meyer Zu Helligen ..................... G06F 16/907 |
| 2021/0195829 A1* | 7/2021 | Crews .................... A01C 7/044 |
| 2021/0243950 A1* | 8/2021 | Blank .................. A01M 21/02 |
| 2021/0337719 A1* | 11/2021 | Schmidt ................. G01C 21/00 |
| 2022/0105960 A1* | 4/2022 | Yuki ................... B60W 60/0025 |
| 2022/0167543 A1* | 6/2022 | Bast ..................... G05D 1/0223 |

\* cited by examiner

PREDICTIVE TECHNIQUE FOR DISPENSING PRODUCT FROM TRACTOR TOOL

TECHNICAL FIELD

The disclosure generally relates to the field of autonomous, semi-autonomous (e.g., some functionality is autonomous and other functionality requires manual human operation), and automated vehicles, and more particularly relates to improving efficiency in autonomous and semi-autonomous farming equipment in dispensing product in a farming area.

BACKGROUND

As farming equipment is integrated with technology to automate activities of tractors and tools, inaccuracies in predictions cause inefficiencies, such as loss of product (e.g., planting seed in unplantable area), loss of time and fuel (e.g., seed not dispensed in a plantable area based on inaccuracy in speed predictions, requiring re-visiting an area which expends more fuel), and so on. To avoid these inefficiencies, "safeguards" may be put in place, such as switching operation of a tractor and/or a tool to manual operation, preventing dispensing of a product unless it is guaranteed that a product will be dispensed where it is supposed to be dispensed, and so on. However, the safeguards themselves ensure inefficiencies in that they prioritize avoiding one dimension of inefficiency (e.g., loss of product) in exchange for an inefficiency in another (e.g., loss of time and loss of fuel).

SUMMARY

Systems and methods are disclosed herein for improving predictive techniques in autonomous farming equipment. The improvement in predictive techniques incorporates parameters of tractor operation (e.g., speed, acceleration, turn parameters), to predict when a tractor is a certain distance away from where a product should be dispensed (e.g., a distance that would be covered in an amount of time corresponding to a mechanical delay time of dispensing product using a tool). A tractor controller may thus cause a dispensing of product to begin ahead of when a tractor tool is located where the product is to be dispensed. As an example, a planter or air seeder tool might take five seconds to discharge seeds from a time at which a dispense operation begins. The tractor controller as disclosed herein would enable the planter tool to begin a dispense operation five seconds before arriving at a plantable site, thus ensuring that product is not lost while optimizing for time and fuel expenditure.

In an embodiment, a tractor controller detects a trigger to dispense a product using a tool operably coupled to a tractor. The controller determines whether the tractor is in an automated mode, the automated mode enabling autonomous speed and direction navigation of the tractor. Responsive to determining that the tractor is not in the automated mode, the controller determines whether the tool is in a ready state. Responsive to determining that the tool is in the ready state, the controller commands the tool to dispense the product, where the tool is not commanded to dispense the product until the tool is in the ready state. Responsive to determining that the tractor is in the automated mode, the controller commands the tool to dispense the product without regard to whether the tool is in the ready state.

In an embodiment, a tractor controller (or controller implemented in the tool itself, in the cloud, or otherwise communicatively coupled to the components discussed herein) detects a trigger to dispense a product at a dispense point using a tool operably coupled to a tractor. In response to detecting the trigger, the tractor controller determines a delay time between commanding the tool to dispense the product and the product actually being dispensed. The tractor controller determines a release point based on operating parameters of the tractor, the release point being a point at which the tractor is predicted to be an amount of time away from the dispense point equal to the delay time, determines that the tractor has reached the release point, and commands the tool to dispense the product, wherein the product reaches the dispense point based on the delay time.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Exemplary Tractor Configuration

Figure 1:
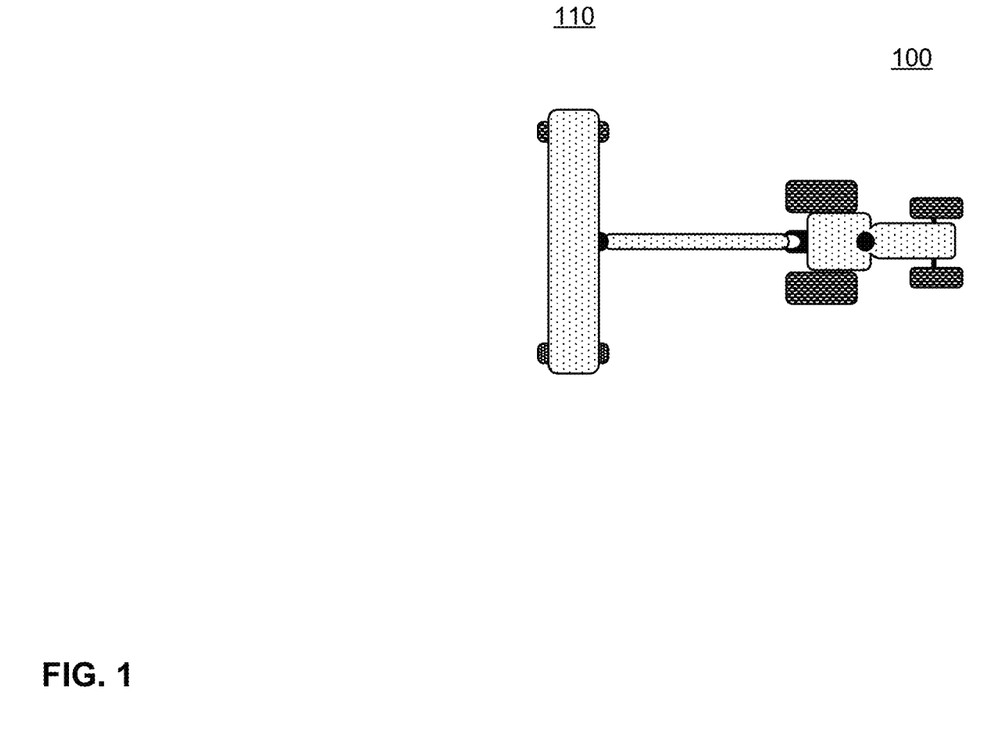
FIG. 1 illustrates one embodiment of a tractor and a tool that is operably coupled to the tractor.

FIG. 1 illustrates one embodiment of a tractor and a tool that is operably coupled to the tractor. As depicted in FIG. 1, tractor 100 is operably coupled to tool 110. Tractor 100 may be any vehicle that is operable to drag or carry tool 110. While tractor 100 is typically a tractor operating on farmland, any other vehicle that is not a tractor but is capable of dragging or carrying tool 110, or being integrated with tool 110, may be used wherever a tractor is mentioned herein (e.g., a self-propelled machine, where a tractor and tool are integrated such as a self-propelled sprayer). Tool 110 is a tool operated in conjunction with activity of a tractor that is capable of dispensing product. The term product, as used herein, may refer to any solid, fluid, or gas releasable by tool 110. For example, tool 110 may be device for planting seeds, releasing fertilizer, releasing water, releasing pesticides, and for dispensing any other product, as well as tools that perform other functions unrelated to releasing product, such as tillage tools for preparing soil and/or indicating whether soil is at a working depth, where double tilling without referencing such an indicator could result in wasted fuel.

The term "operably coupled" as used herein with respect to tool 110 and tractor 100 may refer to either or both of a physical attachment and a data network attachment that enables data communications to occur between tool 110 and one or more controllers of tractor 100. For example, the data communications may enable tool 110 to receive commands (e.g., dispense product) and/or sensor information (e.g., tractor is accelerating at X pace; tractor is traveling at Y speed, etc.).

Figure 2:
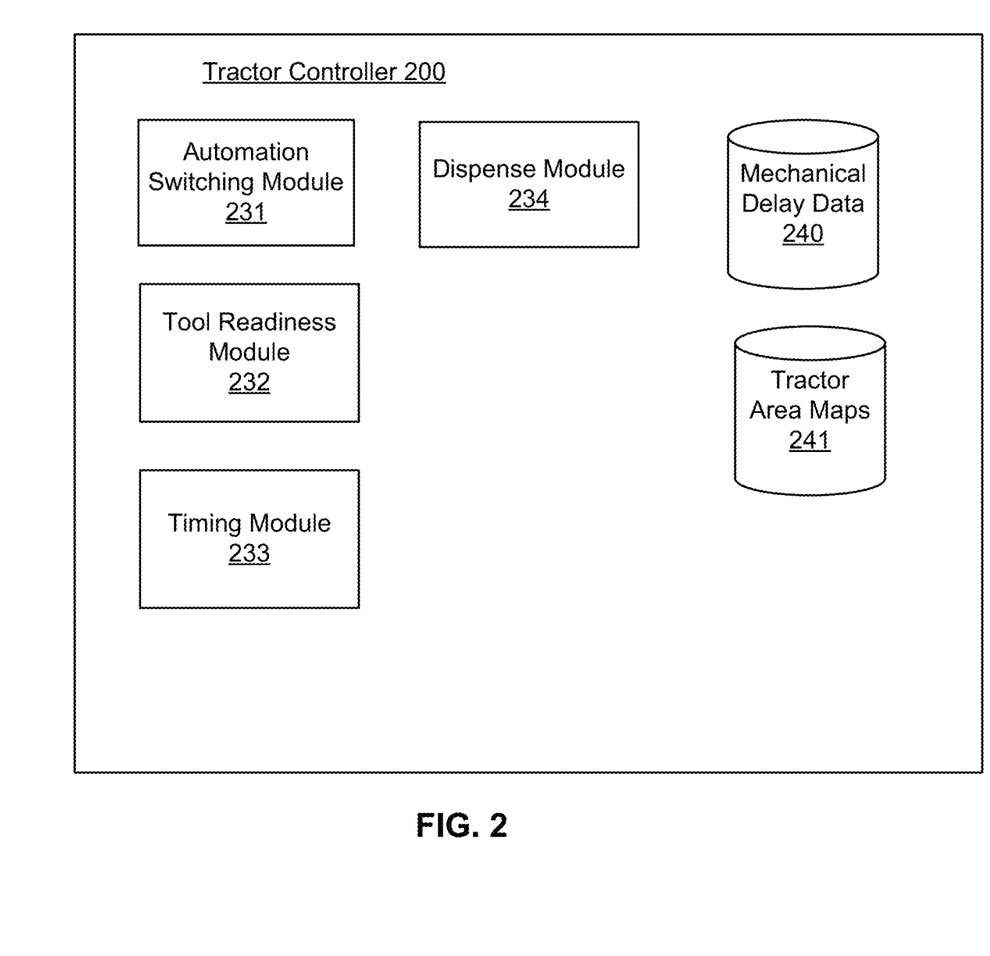
FIG. 2 illustrates one embodiment of exemplary modules and databases used by a tractor controller.

FIG. 2 illustrates one embodiment of exemplary modules and databases used by a tractor controller. As depicted in FIG. 2, tractor controller 200 includes automation switching module 231, tool readiness module 232, timing module 233, dispense module 234, mechanical delay data 240, and tractor area maps 241. The modules and databases depicted in tractor controller 200 are merely exemplary; fewer or more modules and/or databases may be used to achieve the functionality described herein. Moreover, while the databases are depicted as part of tractor controller 200, this is for convenience; the databases may be in whole or in part distributed on other devices and/or on a cloud implementation.

The term "tractor controller," as used herein, may refer to a controller that performs functionality associated with a tractor. A tractor controller may issue commands to components of a tractor (e.g., adjust speed, acceleration, heading, etc.). A tractor controller may issue commands to tools operably coupled to the tractor (e.g., planter, sprayer, etc.). The tractor controller may include a plurality of controllers, and some of those controllers need not be physically located on the tractor. For example, controllers within a tool and/or cloud controllers that issue commands associated with a tractor fall within the ambit of the term "tractor controller." A tractor controller may receive inputs from any sensors, including those onboard a tractor, those on-board a tool, and other sensors.

Automation switching module 231 determines whether a command is received to switch automation of tractor 100 to or from an automated mode. The term automated mode as used herein may refer to a mode having partial or full automation (that is, some or no human intervention is required). Automated modes may be segmented into different types of modes, including a mode where control of activities of tractor 100 is automated for predetermined conditions (e.g., automate speed and acceleration where a tractor is to drive straight, automate speed and acceleration where the ground underneath the tractor is level within a tolerance of a threshold number of degrees, etc.). For such a semi-automated mode, automation switching module 200 may alert a driver (e.g., through an audio or haptic alert) to take over, where operation of the tractor may cease when the predetermined condition ends (e.g., a turn is required that breaks the straightaway). Other automated modes may include full automation modes (e.g., tractor automation occurs for all or most circumstances).

Automation switching module 231 switches between manual and one or more automation modes based on receipt of commands to do so and/or based on a condition being met. For example, where a user, such as a tractor operator, inputs a command to switch to or from an automated mode, automation switching module 231 switches the mode accordingly. As another example, where a condition is met to switch to an automated mode (e.g., a straight-away is reached), or to switch to a manual mode (e.g., a curve is reached), automation switching module 231 may switch the mode. Switching may occur seamlessly, or may occur subject to automation switching module 231 prompting an operator of tractor 100 for permission to switch modes, and doing so responsive to interaction by the operator indicating approval of the prompt.

Tool readiness module 232 determines whether a tool is ready to dispense product. Determining whether a tool is ready to dispense product amounts to determining whether one or more conditions are met that are prerequisite to a tool dispensing product. Tool readiness module 232 determines whether those prerequisite conditions are met, and based on that determination, outputs a state of the tool, the state being either that the tool is, or is not, ready to dispense product. As an example, a planter may be in a ready state when it is physically staked or lowered in the ground, and may not be ready unless that condition is met (e.g., because seeds would be caused to be released in the air which results in loss of seeds due to planting in unplantable area).

In an embodiment, tool readiness module 232 begins a determination (or a re-determination) of whether a given tool is ready to dispense product responsive to detecting a trigger. The term trigger, as used herein, may refer to a scenario where a tool is commanded to dispense product, either when received or at a time defined by the trigger. A trigger may be an express command to dispense product (e.g., an operator of a tractor commands a planter to dispense seeds). A trigger may be an implicit command determined by tractor controller 200 based on a predefined condition occurring (e.g., a map from tractor area maps 241 shows plantable area where seeds are to be dispensed, and identifies a trigger as the tractor approaches and/or reaches the plantable area).

In an embodiment, dispense module 234 detects the trigger responsive to determining that the tool will reach a site designated for dispensing the product in an amount of time corresponding to a mechanical delay by the tool in dispensing the product. To determine the mechanical delay, timing module 233 may access mechanical delay data 240, which may include one or more data structures that map different tools to different mechanical delay times. For example, a planter that takes five seconds to lower into a planting site would indicate a mechanical delay of five seconds. As another example, a sprayer that takes half of one second to activate (e.g., to move a nozzle from a closed to an open position) would have an indication in the data structure of a mechanical delay of half of one second. In an embodiment, there may be many different mechanical delays (e.g., delays relating to raising or lowering a tool, delays relating to starting and stopping dispensing, etc.), and the delays in the aggregate may be accounted for in determining a mechanical delay time.

Dispense module 234 accesses information from tractor area maps 241 and calculates an estimated time that tractor 100 will arrive at a location where a given tool is to be used based on sensor data (e.g., speed, acceleration, yaw, etc.) For example, determining that the tractor will reach the site in the amount of time may include determining a speed of the tractor, determining an acceleration of the tractor, and calculating, based on the speed and acceleration of the tractor, a point from which the tractor is the amount of time away from the site. As another example, where a curved trajectory exists between a current position of the tractor and the site, determining that the tractor will reach the site in the amount of time further may include dispense module 234 determining a yaw of the curve, wherein the calculating of the point is further based on the yaw of the curve. In an embodiment, the speed and acceleration vary by predetermined amounts along the curved trajectory, and so the calculating is further based on the variance in the speed and the acceleration. Dispense module 234 compares the estimated time to the mechanical delay time, and when they are equal (e.g., within a threshold tolerance), dispense module 234 determines that the tool will reach the site designated for dispensing the product in the amount of time corresponding to the mechanical delay for that tool.

Responsive to detecting a trigger for a given tool, tool readiness module 232 determines whether the given tool is ready to dispense product. That is, is the tool physically in a ready position. For example, with reference to a planter, a planter is in a ready position if it is physically staked into the ground, such that seeds will arrive at a definitive location of where the planter is located. This is to be distinguished from non-ready positions, such as a planter being retracted from the ground and/or in a resting position, or being in a "transport" mode where the unit is generally straight behind the tractor, rather than perpendicular). Tool readiness module 232 determines whether the tool is ready for product by transmitting a communication to a controller of the tool, and receiving a response indicating a state of the tool, the state being either a ready state or not. Readiness may also depend on whether a dispensing system is ready, whether an ancillary system is ready (e.g., power generation, etc.), and the like. In some embodiments, tractor controller 200 may be required to determine a ready state for a tool before dispensing products. However, in other embodiments, tractor controller 200 may dispense product without a requirement of a ready state.

Figure 3:
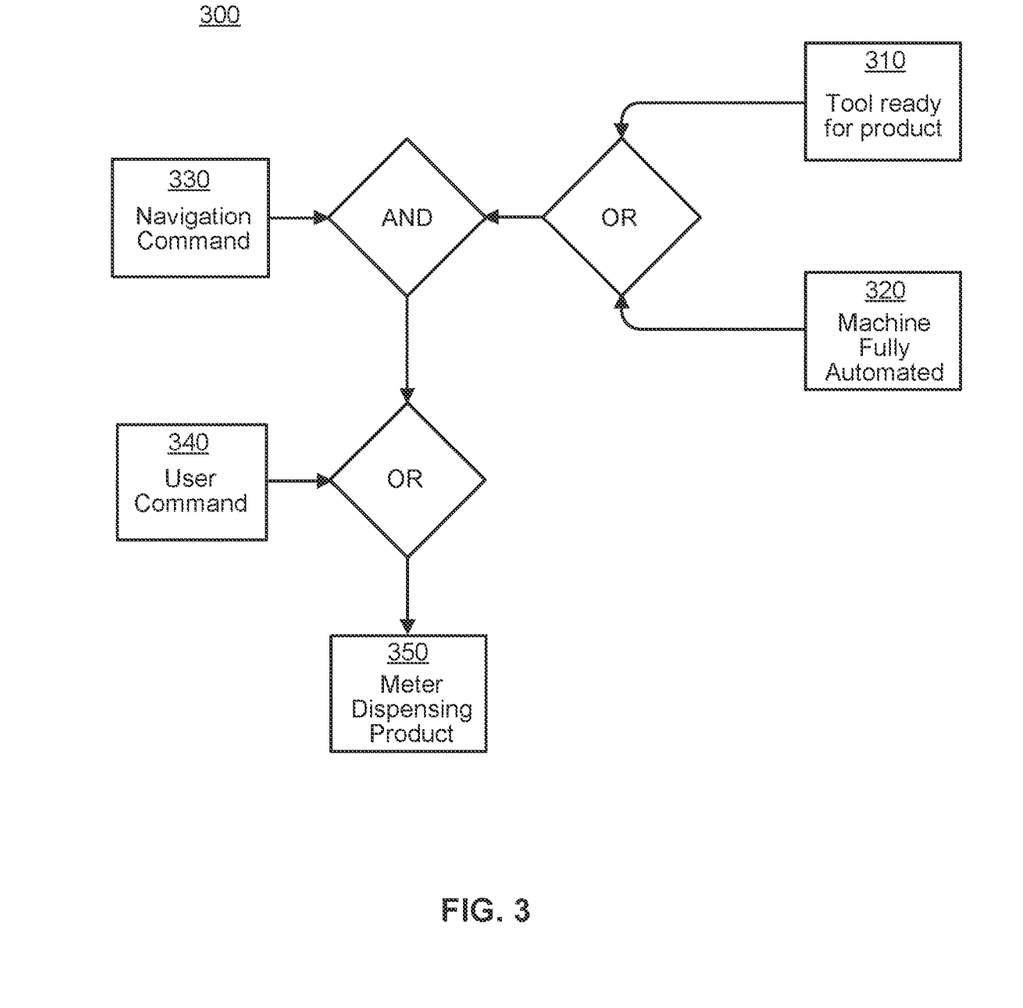
FIG. 3 illustrates one embodiment of a data flow for determining whether to dispense a product.

Turning for the moment to FIG. 3, FIG. 3 illustrates one embodiment of a data flow for determining whether to dispense a product. Data flow 300 begins responsive to determining a trigger, at which time tool readiness module 232 determines whether a gateway condition is true. The term gateway condition, as used herein, may refer to a state of the tractor and/or tool that, if true, allows for further processing in a tool readiness determination, and if false is dispositive that the tool is not ready to dispense the product. Gateway conditions shown in FIG. 3 include conditions 310 and 320. Condition 310 asks whether a tool is ready for product, which is determined by tool readiness module 232. Dispense module 234 may operate in parallel with tool readiness module 232, and may, regardless of whether a tool is ready, analyze for condition 320. Condition 320 asks whether a machine (e.g., tractor 100) operating the tool is in a fully automated mode. For example, where a tool is a planter and the tractor is operating in a fully automated mode, with knowledge of every move the tractor will make in the next five seconds and with knowledge that the delay time of dispensing seeds is five seconds, seeds may be dispensed five seconds in advance of the tool being ready and still reach their desired destination. Where either of gateway conditions 310 and 320 are true, process 300 continues; otherwise, process 300 ends or is repeated until either of gateway conditions 310 or 320 are true. Gateway conditions 310 and 320 are merely exemplary. While they are depicted in the alternative, gateway conditions may be used in the conjunctive. Moreover, any condition and any number of conditions may be used as gateway conditions (e.g., depending on which tool is implicated by tool readiness module 232). Gateway conditions other than 310 may be monitored using dispense module 234.

Process 300 goes on to dispense module 234 monitoring for triggers 330 and 340 where requisite gateway conditions are true. As depicted, trigger 330 corresponds to a condition corresponding to an implied trigger (e.g., an automated system is navigating to a place where product is to be dispensed at a known time or place). Trigger 340 corresponds to an express command. Where a trigger occurs and a gateway condition is true, then process 300 goes on to assign a tool a state 350 indicating that product can be dispensed. As depicted in FIG. 3, state 350 indicates that tractor controller 200 is to meter the dispensing of the product (e.g., product may be immediately dispensed, or may be held back until such a time that product should be dispensed, such as a time-distance from a plantable site corresponding to a time delay of a planter). Because condition 310 does not need to be true to reach state 350, product can be dispensed regardless of whether a tool is ready to dispense the product (e.g., where condition 320 is true). This may be considered to be removal of a safeguard (e.g., of requiring a planter to be in the ground) given that the process itself ensures accurate dispensation of product without the safeguard. In an embodiment, rather than beginning the determination responsive to detecting a trigger, process 300 may continually (e.g., periodically, a-periodically, or responsive to a predefined condition) determine whether a trigger exists simultaneous with a gateway condition being true, and based on such a determination, tool readiness module 230 may determine that a state 350 is to be assigned for the tool.

Exemplary Data Flows

Figure 4A:
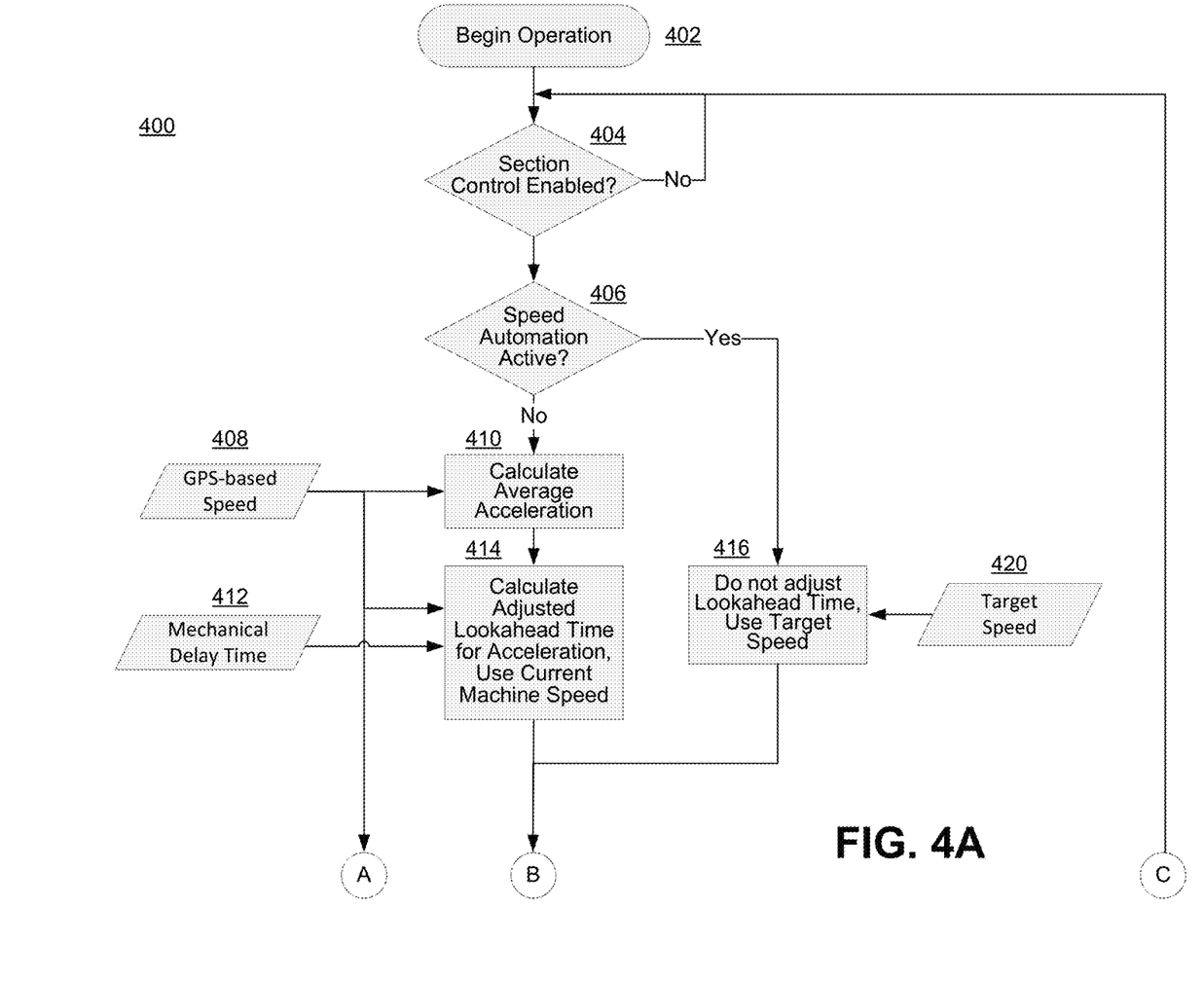
FIGS. 4A-4C illustrate one embodiment of an end-to-end data flow for performing an operation.
Figure 4B:
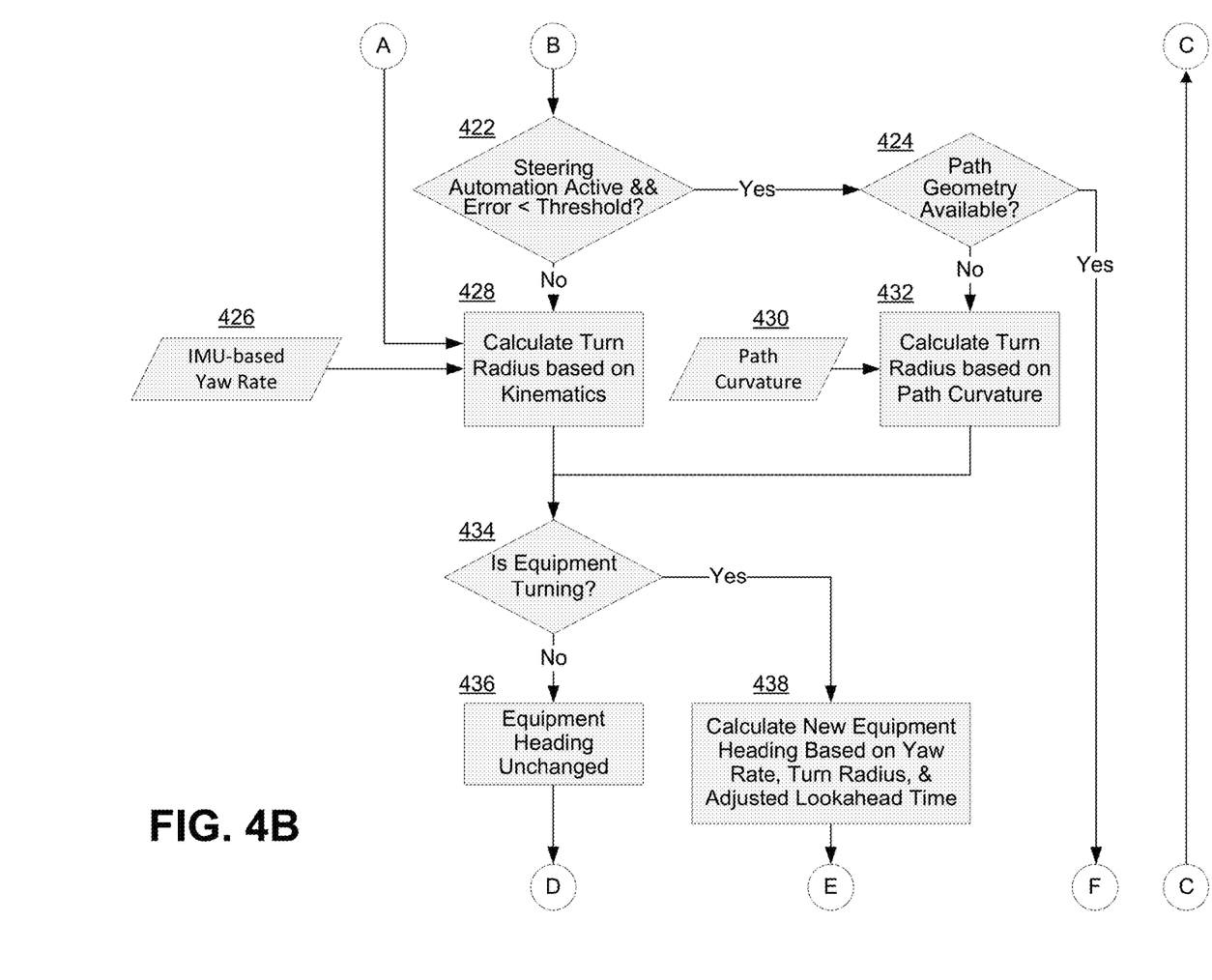
Figure 4C:
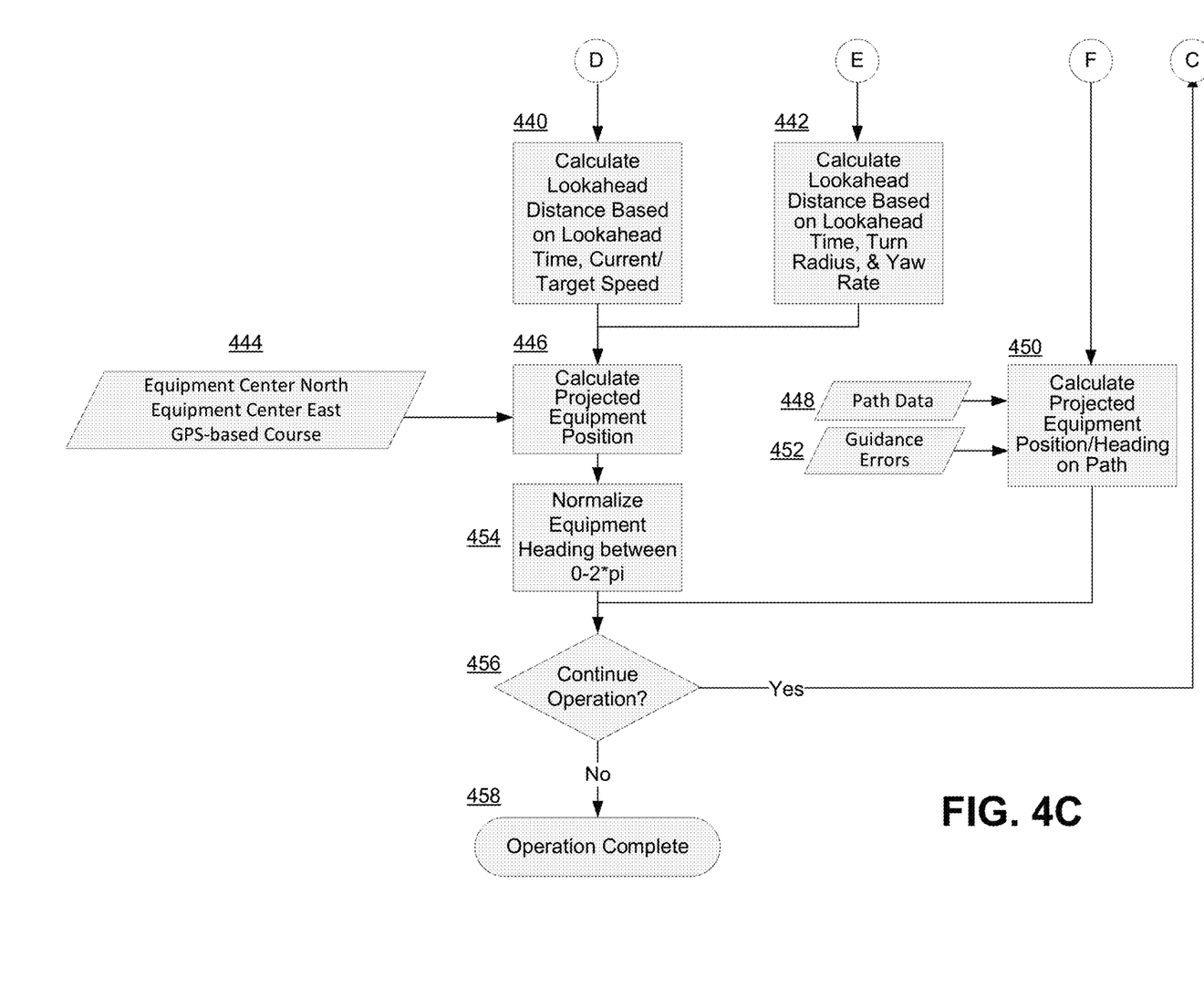

FIGS. 4A-4C illustrate one embodiment of an end-to-end data flow for performing an operation. The data flow depicted across FIGS. 4A-4C is merely exemplary of one use case. The term machine, as used in FIG. 4, generally refers to a tractor (e.g., tractor 100) operably coupled to a tool (e.g., tool 110), but can be any other machine defined with respect to the scope of the term tractor above. In the embodiment of FIGS. 4A-4C, for self-propelled machines (e.g., motorized machines that are fully automated), data used to predict location at any given time may be based on global positioning system (GPS) and/or inertial data assumed to be at tractor controller 200 of that machine. Moreover, in some embodiments, GPS and/or inertial data may be at a controller on-board tool 110 (also referred to in FIGS. 4A-4C as an "implement"); however, where no such controller is present, data at tractor controller 200 of the machine may be used instead.

Process 400 begins with the beginning of an operation 402 detected by tractor controller 200. An operation as used herein may refer to a particular use of a tool or activity of a tractor. Tractor controller 200 determines 404 whether section control is enabled. The term section control, as used herein, refers to a semi-automated mode where tractor controller 200 assumes full control of the tractor in some conditions (e.g., on straight, flat land) and potentially with some limitations (e.g., speed is constant). The term "section" may refer to an area of a space where tool 110 is to be used (e.g., a section of a farm) in a consistent manner (e.g., in this section, drive the tractor forward at a constant speed and plant seed at a certain metered rate). Where section control is not enabled, automated operation does not occur, and the operation is manually performed Where section control is enabled, tractor controller 200 determines 406 whether speed automation is active. Speed automation refers to automation of a change in speed, rather than automation of maintenance of speed. For example, where tractor controller 200 is empowered to change speed based on sensor data (e.g., map data, obstacle sensors, camera input, etc.), tractor controller 200 may accelerate tractor 100 or decelerate tractor 100 accordingly where speed automation is active. Where speed automation is active, tractor controller determines 416 that it does not need to adjust a lookahead time, and instead use the target speed determined through speed automation (e.g., target speed 420). The term lookahead time, as used herein, refers to a time ahead of a current time at which a tool may be operated (e.g., to dispense product). A lookahead time where speed automation is not active would be inaccurate if any change in speed were to occur between a current time and a lookahead time, because the lookahead time would not account for the change in speed. Thus, responsive to determining that speed automation is not active, tractor controller 200 performs activities (408-414) to determine an adjusted lookahead time.

When calculating an adjusted lookahead time, tractor controller 200 calculates 410 a statistical representation (e.g., average) of acceleration (e.g., based on data from accelerometer sensor and/or speed sensor, such as using 408 a GPS-based speed based on a change of GPS coordinates of tractor 100 over time). Tractor controller 200 then calculates 414 the adjusted lookahead time for acceleration based on a current speed of a machine. The calculation may use 412 the mechanical delay time of a given tool to determine when to initiate operation of the tool (e.g., an offset of the mechanical delay time prior to the lookahead time). Where the tractor is turning, turn information may feed back into the calculation 410 of the average acceleration and/or the calculation 414 of the adjusted lookahead time (e.g., as shown in FIG. 4B).

Moving on to FIG. 4B, tractor determines 422 whether steering automation is active and if so, whether an error in steering automation is below a threshold. The term steering automation, as used herein, may refer to an automatic turning of wheels of tractor 100 to follow a path. The error and threshold may refer to a comparison of an expected position based on a predefined path or a path determined based on predefined parameters, and an actual path, where the threshold mandates a maximum deviation from that path. The term path information, as used herein, may refer to data that indicates a path of the tractor, or from which a path of the tractor may be derived. Where determination 422 is not satisfied, tractor controller calculates 428 a turn radius based on kinematics, which may be influenced based on an IMU (Inertial Measurement Unit)-based yaw rate 426. Where determination 422 is satisfied, tractor controller determines 424 whether a path geometry is available (e.g., based on a path determined using steering automation and/or a path defined by a map). Where path geometry is available, tractor controller 200 uses the path geometry to calculate 450 position and heading (shown in FIG. 4C, on the basis of path data 448 and guidance errors 452 (e.g., deviation from path, where current deviation is accounted for in determining what commands are to be issued for a future position). While position is described with respect to a position of a tractor, the term position may refer to the position of the tool. Otherwise, tractor controller 200 calculates 432 a turn radius based on the path curvature 430. Path curvature is determined based on future points the tractor is instructed to navigate to. This differs from kinematics determination because the current motion is used to predict what the future curvature will be.

Tractor controller 200 determines 434 whether the equipment is turning, and if not, determines 436 that the equipment heading is unchanged, and goes on to calculate 440 the lookahead distance (that is, distance to a point where a tool is to be used, such as to dispense product) based on the lookahead time and the current and/or target speed. Where the equipment is turning, tractor controller 200 calculates 438 a new equipment heading based on yaw rate, turn radius, and adjusted lookahead time, and goes on to calculate 442 the lookahead distance based on the lookahead time, the turn radius, and the yaw rate. Regardless of how the lookahead time was calculated, tractor controller 200 calculates 446 the projected equipment position using the lookahead time. This may be based on information 444 including a GPS-based course on the basis of a point representative of the equipment center's north and east. Information 444 may be an input used to transform from tractor-centric coordinates (e.g., 0,0 is based on where the tractor is, and up is always up) to real-world coordinates (e.g., 0,0 is in a defined spot in the world, and north is up). In general, process 400 is calculated relative to a tractor's location, but may be translated using information 444 to real-world coordinates.

Where necessary (as shown in FIG. 4C), tractor controller 200 normalizes 454 the equipment heading (e.g., to a value between 0 and 2*pi). The equipment heading is then used to determine the operation (e.g., to determine when to begin dispensing product, such as seed, and this can be regardless of whether a tool is in a ready position). For as long as the operation continues 456, tractor controller 200 may repeat the process of FIGS. 4A-4C (e.g., shown in line C), and then may determine 458 that the operation is complete (e.g., seed has been sufficiently dispensed over plantable area).

Figure 5:
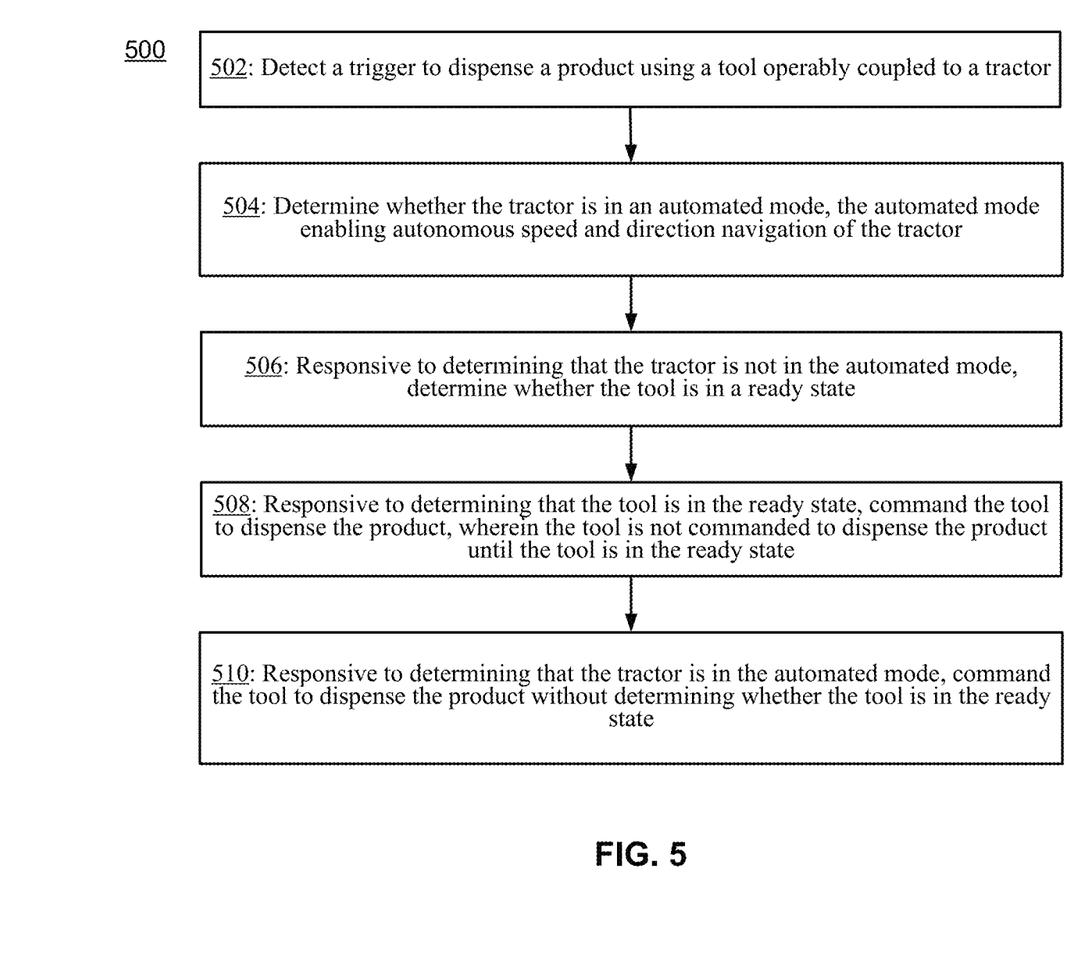
FIG. 5 illustrates one embodiment of an exemplary data flow for dispensing product by a tractor.

FIG. 5 illustrates one embodiment of an exemplary data flow for dispensing product by a tractor. Process 500 begins with a processor (e.g., processor 702 of FIG. 7 of tractor controller 200 of tractor 100) detecting 502 a trigger to dispense a product using a tool operably coupled to a tractor (e.g., tool 110 of tractor 100). The processor determines 504 whether the tractor is in an automated mode (e.g., using automation switching module 231), the automated mode enabling autonomous speed and direction navigation of the tractor. Responsive to determining that the tractor is not in the automated mode, the tractor determines 506 whether the tool is in a ready state (e.g., using tool readiness module 232), and, responsive to determining that the tool is in the ready state, the processor commands 508 the tool to dispense the product, where the tool is not commanded to dispense the product until the tool is in the ready state. Responsive to determining that the tractor is in the automated mode, the processor commands 510 the tool to dispense the product without regard to whether the tool is in the ready state.

Figure 6:
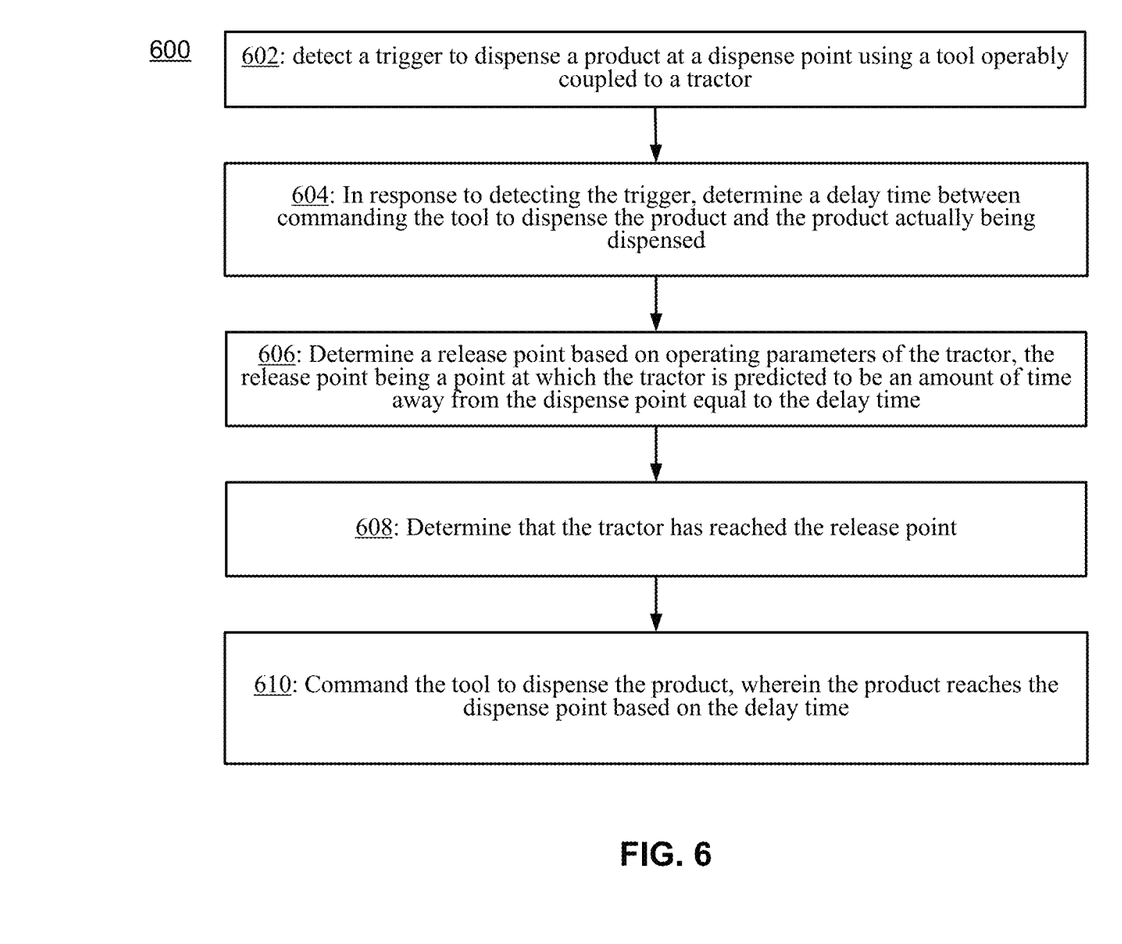
FIG. 6 illustrates one embodiment of an exemplary data flow for pre-charging a tool.

FIG. 6 illustrates one embodiment of an exemplary data flow for pre-charging a tool. The term pre-charge, as used herein, may refer to the act of dispensing product prior to a tool being situated at a site designated for the product, such that by the time the product exits the tool, the product lands at the site designated for the product. Process 600 begins with a processor (e.g., processor 702 of FIG. 7 of tractor controller 200 of tractor 100) detecting 602 a trigger to dispense a product at a dispense point using a tool operably coupled to a tractor (e.g., tool 110 of tractor 100).

The processor determines 604, in response to detecting the trigger, a delay time between commanding the tool to dispense the product and the product actually being dispensed. The delay time may be a mechanical delay associated with the tool, such as a 5 second delay between a seed being released and a seed reaching the nozzle of a planter. The processor determines 606 a release point based on operating parameters of the tractor, where the release point is a point at which the tractor is predicted to be an amount of time away from the dispense point that is equal to the delay time. For example, the processor may determine various parameters such as acceleration, speed, turn radius, and so on (all described in the foregoing), and may use this information in conjunction with the delay time to determine at what point to dispense the product (e.g., following the planter-seed example, knowledge of the operating parameters of the tractor enables the processor to determine when the tractor is 5 seconds away from a dispense point).

The processor determines 608 that the tractor has reached the release point (e.g., the tractor is 5 seconds away), and commands 610 the tool to dispense the product, such that the product reaches the dispense point based on the delay time. Process 600 functions whether or not the tractor is in an automated mode or in a semi-automated or manual mode. Pre-defined maps and/or boundaries may be used, where a path plan (e.g., a plan as to where a tractor is to drive that optionally includes designations of operating parameters at any given point such as speed, acceleration, turns, etc., and any other relevant information such as dispense points) is indicated by the map/boundary information. Process 600 enables a safeguard to be disabled, the safeguard preventing loss of product by ensuring the tool is at a dispense site before enabling dispensing to occur, by factoring in mechanical delay and operating parameters to ensure product will not be wasted if released early (e.g., at a release point), and when the product reaches, e.g., the nozzle of a planter, the product will fall into a dispense point.

Computing Machine Architecture

Figure 7:
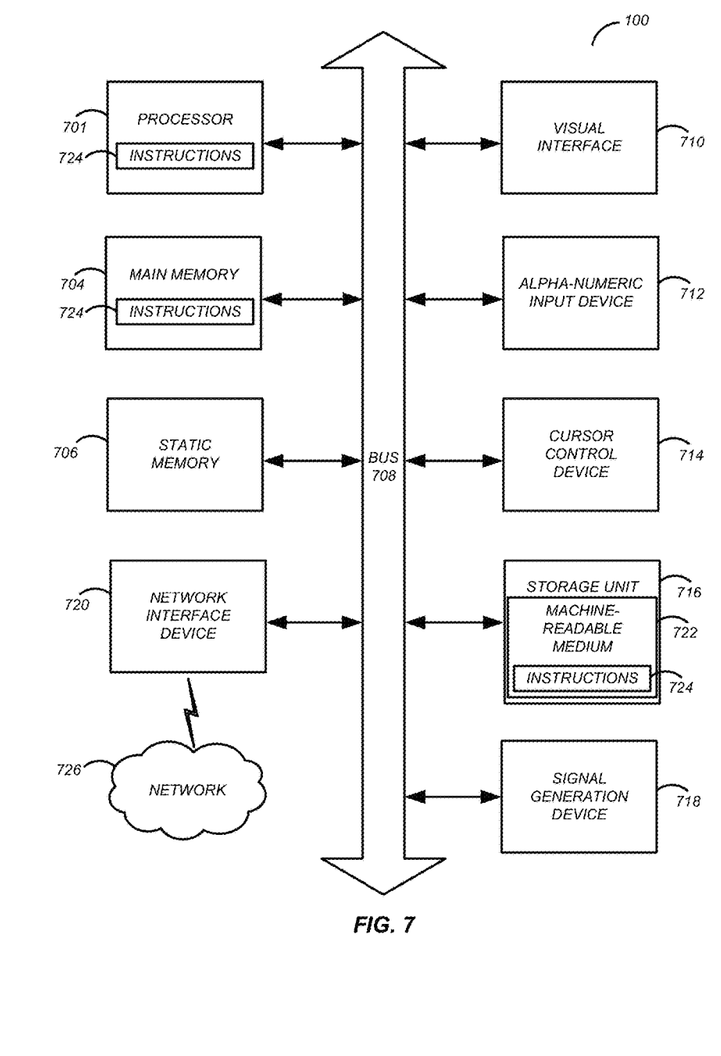
FIG. 7 is a block diagram illustrating components of an example machine able to read instructions from a machine-readable medium and execute them in a processor (or controller).

FIG. (FIG. 7 is a block diagram illustrating components of an example machine able to read instructions from a machine-readable medium and execute them in a processor (or controller). Specifically, FIG. 7 shows a diagrammatic representation of a machine in the example form of a computer system 700 within which program code (e.g., software) for causing the machine to perform any one or more of the methodologies discussed herein may be executed. The program code may be comprised of instructions 724 executable by one or more processors 702. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 724 (sequential or otherwise) that specify actions to be taken by that machine. Further, while only a single machine is illustrated, the term "machine" shall also be taken to include any collection of machines that individually or jointly execute instructions 724 to perform any one or more of the methodologies discussed herein.

The example computer system 700 includes a processor 702 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 704, and a static memory 706, which are configured to communicate with each other via a bus 708. The computer system 700 may further include visual display interface 710. The visual interface may include a software driver that enables displaying user interfaces on a screen (or display). The visual interface may display user interfaces directly (e.g., on the screen) or indirectly on a surface, window, or the like (e.g., via a visual projection unit). For ease of discussion the visual interface may be described as a screen. The visual interface 710 may include or may interface with a touch enabled screen. The computer system 700 may also include alphanumeric input device 712 (e.g., a keyboard or touch screen keyboard), a cursor control device 714 (e.g., a mouse, a trackball, a joystick, a motion sensor, or other pointing instrument), a storage unit 716, a signal generation device 718 (e.g., a speaker), and a network interface device 720, which also are configured to communicate via the bus 708.

The storage unit 716 includes a machine-readable medium 722 on which is stored instructions 724 (e.g., software) embodying any one or more of the methodologies or functions described herein. The instructions 724 (e.g., software) may also reside, completely or at least partially, within the main memory 704 or within the processor 702 (e.g., within a processor's cache memory) during execution thereof by the computer system 700, the main memory 704 and the processor 702 also constituting machine-readable media. The instructions 724 (e.g., software) may be transmitted or received over a network 726 via the network interface device 720.

While machine-readable medium 722 is shown in an example embodiment to be a single medium, the term "machine-readable medium" should be taken to include a single medium or multiple media (e.g., a centralized or distributed database, or associated caches and servers) able to store instructions (e.g., instructions 724). The term "machine-readable medium" shall also be taken to include any medium that is capable of storing instructions (e.g., instructions 724) for execution by the machine and that cause the machine to perform any one or more of the methodologies disclosed herein. The term "machine-readable medium" includes, but not be limited to, data repositories in the form of solid-state memories, optical media, and magnetic media.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for tractor control through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method comprising:
    detecting a trigger to dispense a product using a tool operably coupled to a tractor, wherein detecting the trigger comprises determining that the tool will reach a site designated for dispensing the product in an amount of time corresponding to a mechanical delay by the tool in dispensing the product, the mechanical delay determined based on a time required to move one or more physical components of the tool from an unready state to a ready state;
    responsive to detecting the trigger to dispense the product using the tool:
        determining whether the tractor is in an automated mode, the automated mode enabling autonomous speed and direction navigation of the tractor;
        responsive to determining that the tractor is not in the automated mode:
            determining whether the tool is in the ready state; and
            responsive to determining that the tool is in the ready state, commanding the tool to dispense the product, wherein the tool is not commanded to dispense the product until the tool is in the ready state; and
        responsive to determining that the tractor is in the automated mode:
            commanding the tool to dispense the product without determining whether the tool is in the ready state, wherein commanding the tool to dispense the product is performed using one or more processors and comprises beginning a dispense operation, wherein the product is dispensed after the mechanical delay time passes from the beginning of the dispense operation.

2. The method of claim 1, wherein determining that the tractor will reach the site in the amount of time comprises:
    determining a speed of the tractor;
    determining an acceleration of the tractor; and
    calculating, based on the speed and acceleration of the tractor, a point from which the tractor is the amount of time away from the site.

3. The method of claim 2, wherein a curved trajectory exists between a current position of the tractor and the site, and wherein determining that the tractor will reach the site in the amount of time further comprises determining a yaw of the curved trajectory, wherein the calculating of the point is further based on the yaw of the curved trajectory.

4. The method of claim 3, wherein the speed and acceleration vary by predetermined amounts along the curved trajectory, and wherein the calculating is further based on a variance in the speed and the acceleration.

5. The method of claim 1, wherein the mechanical delay is determined using a lookup table that corresponds candidate tools to mechanical delay times, and wherein the candidate tools comprise the tool.

6. The method of claim 1, wherein determining that the tool is in the ready state comprises determining that the tool is located at the site.

7. The method of claim 1, wherein commanding the tool to dispense the product comprises beginning a dispense operation, wherein the product is dispensed after a mechanical delay time passes from the beginning of the dispense operation.

8. A non-transitory computer-readable medium comprising memory with instructions encoded thereon, the instructions, when executed by one or more processors, causing the one or more processors to perform operations, the instructions comprising instructions to:
    detect a trigger to dispense a product using a tool operably coupled to a tractor, wherein detecting the trigger comprises determining that the tool will reach a site designated for dispensing the product in an amount of time corresponding to a mechanical delay by the tool in dispensing the product, the mechanical delay determined based on a time required to move one or more physical components of the tool from an unready state to a ready state;
    responsive to detecting the trigger to dispense the product using the tool:
        determine whether the tractor is in an automated mode, the automated mode enabling autonomous speed and direction navigation of the tractor;

responsive to determining that the tractor is not in the automated mode:
    determine whether the tool is in a ready state; and
    responsive to determining that the tool is in the ready state, command the tool to dispense the product, wherein the tool is not commanded to dispense the product until the tool is in the ready state; and
responsive to determining that the tractor is in the automated mode:
    command the tool to dispense the product without determining whether the tool is in the ready state, wherein commanding the tool to dispense the product comprises beginning a dispense operation, wherein the product is dispensed after the mechanical delay time passes from the beginning of the dispense operation.

9. The non-transitory computer-readable medium of claim 8, wherein the instructions to determine that the tractor will reach the site in the amount of time comprise instructions to:
    determine a speed of the tractor;
    determine an acceleration of the tractor; and
    calculate, based on the speed and acceleration of the tractor, a point from which the tractor is the amount of time away from the site.

10. The non-transitory computer-readable medium of claim 9, wherein a curved trajectory exists between a current position of the tractor and the site, and wherein the instructions to determine that the tractor will reach the site in the amount of time further comprise instructions to determine a yaw of the curved trajectory, wherein the calculating of the point is further based on the yaw of the curved trajectory.

11. The non-transitory computer-readable medium of claim 10, wherein the speed and acceleration vary by predetermined amounts along the curved trajectory, and wherein the instructions to calculate are further based on a variance in the speed and the acceleration.

12. The non-transitory computer-readable medium of claim 8, wherein the mechanical delay is determined using a lookup table that corresponds candidate tools to mechanical delay times, and wherein the candidate tools comprise the tool.

13. The non-transitory computer-readable medium of claim 8, wherein the instructions to determine that the tool is in the ready state comprise instructions to determine that the tool is located at the site.

14. The non-transitory computer-readable medium of claim 8, wherein the instructions to command the tool to dispense the product comprise instructions to begin a dispense operation, wherein the product is dispensed after a mechanical delay time passes from the beginning of the dispense operation.

15. A system comprising:
memory with instructions encoded thereon; and
one or more processors that, when executing the instructions, are caused to perform operations comprising:
    detecting a trigger to dispense a product using a tool operably coupled to a tractor, wherein detecting the trigger comprises determining that the tool will reach a site designated for dispensing the product in an amount of time corresponding to a mechanical delay by the tool in dispensing the product, the mechanical delay determined based on a time required to move one or more physical components of the tool from an unready state to a ready state;
    responsive to detecting the trigger to dispense the product using the tool:
        determining whether the tractor is in an automated mode, the automated mode enabling autonomous speed and direction navigation of the tractor;
        responsive to determining that the tractor is not in the automated mode:
            determining whether the tool is in a ready state; and
            responsive to determining that the tool is in the ready state, commanding the tool to dispense the product, wherein the tool is not commanded to dispense the product until the tool is in the ready state; and
        responsive to determining that the tractor is in the automated mode:
            commanding the tool to dispense the product without determining whether the tool is in the ready state, wherein commanding the tool to dispense the product comprises beginning a dispense operation, wherein the product is dispensed after the mechanical delay time passes from the beginning of the dispense operation.

16. The system of claim 15, wherein determining that the tractor will reach the site in the amount of time comprises:
    determining path information of the tractor; and
    calculating, based on speed and acceleration of the tractor, a future position of the tractor based on the path information.

17. The system of claim 16, wherein a curved trajectory exists between a current position of the tractor and the site, and wherein determining that the tractor will reach the site in the amount of time further comprises determining a yaw of the curved trajectory, wherein the calculating of the point is further based on the yaw of the curved trajectory.

* * * * *